J. C. THOMPSON.
VAPOR BURNER.
APPLICATION FILED AUG. 29, 1911.
1,060,867. Patented May 6, 1913.
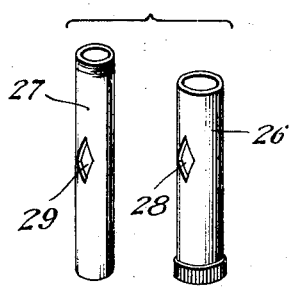
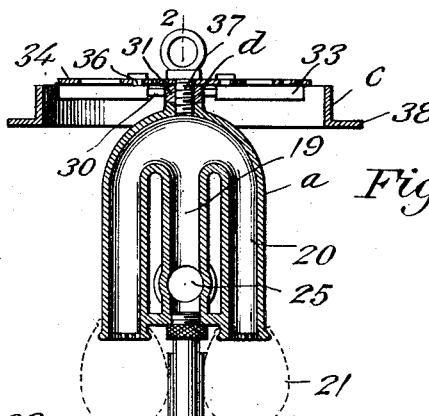
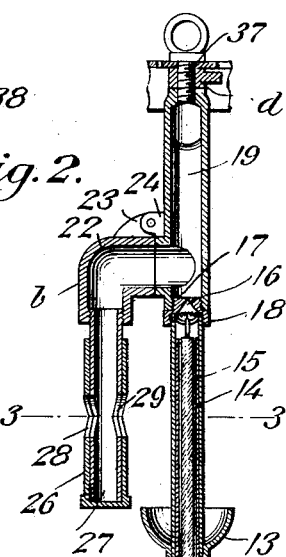
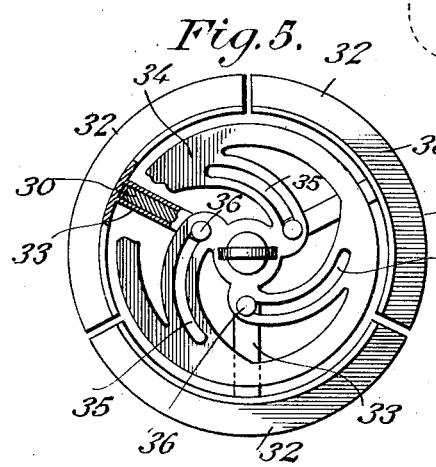
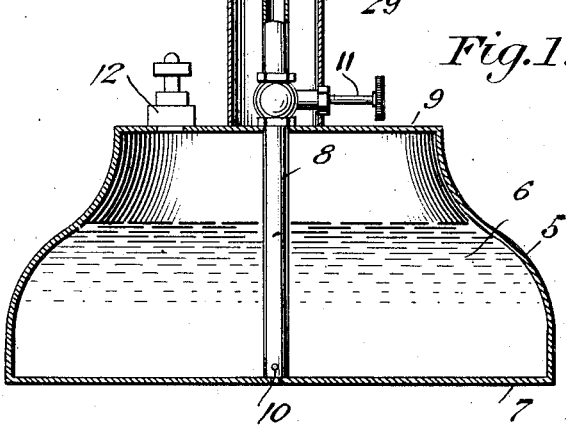
Inventor
Jesse C. Thompson
By Victor J. Evans
Attorney
Witnesses

UNITED STATES PATENT OFFICE.

JESSE C. THOMPSON, OF WESTFIELD, MASSACHUSETTS.

VAPOR-BURNER.

1,060,867.

Specification of Letters Patent.

Patented May 6, 1913.

Application filed August 29, 1911. Serial No. 646,658.

*To all whom it may concern:*

Be it known that I, JESSE C. THOMPSON, a citizen of the United States, residing at Westfield, in the county of Hampden and State of Massachusetts, have invented new and useful Improvements in Vapor-Burners, of which the following is a specification.

The invention has for its general object a portable lamp or illuminating device adapted for burning carbureted air.

Other objects will appear and be better understood from the following description taken in connection with the accompanying drawings, in which, Figure 1 is a view of the device partly in elevation and partly in vertical section. Fig. 2 is a detail vertical section of the generator and head taken approximately on the line 2—2 of Fig. 1. Fig. 3 is a detail section and plan on the line 3—3 of Fig. 2. Fig. 4 is a detail perspective of the parts of the air conduit or tube. Fig. 5 is a detail plan partly in section of the shade support. Fig. 6 is a detail end view of one of the mantle tubes.

5 indicates the reservoir which may be of any suitable contour and adapted to contain the illuminating fluid 6 and preferably formed with an enlarged base 7 so as to support the device as a whole when placed upright on a table or the like.

8 indicates a tube extending upwardly from the bottom of the reservoir and through the top 9 thereof and communicating with the reservoir through openings 10′ arranged adjacent to the lower end of the tube. The tube extends upwardly beyond the reservoir for any suitable distance and the joint between the tube and top 9 of the reservoir is air-tight.

10 indicates an outer casing or ornament surrounding the tube and 11 a valve for controlling the passage of fluid through the tube and operable from the exterior of the casing or ornament 10.

12 indicates a check valve arranged in the top 9 of the reservoir and adapted for connection to an air pump or other device suitable for charging the reservoir with a quantity of compressed air which serves to force the liquid upwardly through the tube through the openings 10 thereof. The upper part of the tube constitutes a generator and carries a priming cup 13.

14 indicates an inner tube suitably secured in the generator and 15 an asbestos wick which extends through the generator and checks the too free flow of liquid therethrough, whereby, to insure of proper vaporization.

16 indicates a choked passage at the upper end of the generator, this passage being formed by either contracting the upper end of the generator or in any other suitable manner such as by forming a tapered opening in the reduced portion 17 of a nozzle having an enlarged portion 18 adapted to screw onto the upper end of the generator.

a indicates the burner head herein shown, comprising a casing interiorly formed to provide a series of relatively spaced tubes of equal length and consisting of a central mixing chamber 19 adapted for detachable connection to the upper end of the generator and gas passages 20. The mixing chamber communicates with the gas passages, while the lower ends of the gas passages 20 are adapted to provide mantle supports for the asbestos mantles 21.

b designates the air tube or conduit through which the air passes into the mixing chamber 19. By preference this element is arranged so as to permit of access to the choked passage 16 should the latter become clogged with extraneous matter contained in the fluid 6. A convenient construction for effecting this result consists in forming the conduit with an elbow 22 having a rib 23 to pivotally connect to a lug 24 on the exterior of the mixing chamber 19. The elbow 22 is angular so that when one side thereof depends the end portion of the opposite side will form a continuation of the lateral opening 25 in the mixing chamber 19.

26 and 27 indicate the sections of the air tube or conduit, the latter of which connects with the elbow 22 and the former of which is adjustably secured to the section 27 and has openings 28 adapted to aline with openings 29 of the section 27 when turned into one position, the said section 26 being further adapted to seal or partially seal the openings 29 when turned to other positions, whereby, to regulate the quantity of air passing into the mixing chamber.

The shade support c is expansible so as to conform to the different sizes of shades. In this connection it will be observed that the said support includes a stationary part d made up of a plurality of radial arms 30 connected at their inner ends by a pierced head 31.

32 indicates a plurality of segmental sections having hollow boxes 33 adapted to loosely receive the arms 30.

34 indicates a disk having cam slots 35 to receive vertical pins 36 at the inner ends of the boxes 33. The slots 35 are so arranged that when the pins are at the inner ends thereof the sections 32 will be contracted. When, however, the disk is turned the sides of the cam slots 35 will force the sections 32 outwardly, whereby, to expand the shade holder. The disk 34 has a central opening adapted to receive the shank 37 of a screw which passes through the portion $d$ and screws into the upper end of the burner head $a$. Each section of the shade support has a lateral flange 38 which forms a bearing surface for the ordinary shade.

In use, a quantity of fluid such as gasolene is introduced into the reservoir 5 the check valve 12 having first been removed therefrom. By preference the quantity of oil or gasolene will not be sufficient to completely fill the chamber as shown in Fig. 1. This done, the valve 12 is connected to the reservoir after which air is compressed into the latter as before stated. When it is desired to use the device a quantity of fluid is introduced into the primary 13 and ignited so as to heat the generator. This done, the valve 11 is opened, whereupon the fluid will be forced upwardly and into the generator where it will be vaporized by the heat of said generator. The air tube or conduit having been regulated, the air passing therethrough will mix with the oil vapor in the mixing chamber 19. The mixture will then flow through the chambers 20 whereupon it may be ignited at the mantles 21 and thus produce the desired illumination and at the same time heat the generator so as to vaporize the liquid passing therethrough. When it is desired to extinguish the light, the valve 11 is simply turned in the required direction so as to cut off the supply of fluid to the generator.

Although I have shown and described one embodiment of the invention it is to be understood that I am not to be limited to the specific structure or arrangement of parts since various changes will be made, within the scope of the appended claim without departing from the spirit or sacrificing any of the advantages of the invention.

What I claim as new is:

In a vapor burner, the combination with a generator, of a burner head detachably connected to the generator, said burner head comprising a casing interiorly formed to provide a central mixing chamber having a lateral opening adjacent its point of connection with the generator and gas passages disposed on opposite sides of said mixing chamber in depending spaced parallel relation thereto, and communicating therewith, a lug formed on the exterior of said mixing chamber directly above the lateral opening, an air conduit consisting of an elbow pivotally connected to the lug and disposing the former in registration with the lateral opening.

In testimony whereof I affix my signature in presence of two witnesses.

JESSE C. THOMPSON.

Witnesses:
 FREDERIC A. BALLOU,
 LEWIS C. PARKER.